US005696181A

United States Patent [19]

Chang et al.

[11] Patent Number: 5,696,181
[45] Date of Patent: Dec. 9, 1997

[54] DENTURE FIXATIVE

[75] Inventors: Tiang-Shing Chang, Westfield; Donna DiFerdinando, Union Beach, both of N.J.

[73] Assignee: The Block Drug Company, Inc., Jersey City, N.J.

[21] Appl. No.: 532,132

[22] Filed: Sep. 22, 1995

[51] Int. Cl.$^6$ ............................. A61C 13/23; C08L 93/00
[52] U.S. Cl. ..................... 523/118; 523/120; 430/180; 430/228.1; 524/28; 524/45; 524/55; 524/377; 524/439; 524/440
[58] Field of Search .................... 523/120, 118; 433/180; 524/45, 28, 377, 55, 439, 440

[56] References Cited

U.S. PATENT DOCUMENTS

| | | | |
|---|---|---|---|
| 4,339,279 | 7/1982 | Hesselgren | 106/35 |
| 4,373,036 | 2/1983 | Chang et al. | 523/120 |
| 4,470,814 | 9/1984 | Chang et al. | 433/180 |
| 4,514,528 | 4/1985 | Dhabhar et al. | 523/120 |
| 4,521,551 | 6/1985 | Chang et al. | 523/120 |
| 4,521,565 | 6/1985 | Bowen | 427/2 |
| 4,542,168 | 9/1985 | Chang et al. | 523/118 |
| 4,569,955 | 2/1986 | Dhabhar et al. | 523/120 |
| 4,804,412 | 2/1989 | Komiyama et al. | 106/35 |
| 5,001,170 | 3/1991 | Keegan | 523/120 |
| 5,047,490 | 9/1991 | Pelah et al. | 526/271 |
| 5,093,387 | 3/1992 | Schobel et al. | 523/120 |
| 5,154,613 | 10/1992 | Cohen | 433/228 |
| 5,187,308 | 2/1993 | Pelah et al. | 560/202 |
| 5,204,383 | 4/1993 | Manabe et al. | 523/118 |
| 5,204,414 | 4/1993 | Pelah et al. | 525/327 |
| 5,298,534 | 3/1994 | Prosise et al. | 523/120 |
| 5,304,616 | 4/1994 | Rajaiah et al. | 526/240 |
| 5,395,867 | 3/1995 | Prosise et al. | 524/55 |

*Primary Examiner*—Andrew E. C. Merriam
*Attorney, Agent, or Firm*—Craig M. Bell; Dann, Dorfman, Herrell and Skillman

[57] ABSTRACT

An improved denture adhesive composition is comprised of a highly cross-linked lower alkyl ether/maleic acid or maleic anhydride copolymer in which up to about 85% of the initial free carboxyl groups are reacted with one or more cross-linking agents. The cross-linking agents are mixtures of inorganic divalent cations such as calcium, magnesium and zinc together with organic bifunctional compounds comprised of polyhydroxyl compounds such as propylene glycol, glycerin and the like. The copolymer has a specific viscosity of no less than 1.5. A hydrophilic polymer such as sodium alginate or carboxymethyl cellulose may also be added to the lower alkyl vinyl ether/maleic acid or maleic anhydride copolymer which is then formulated with other excipients in a paste, powder, liquid, gel or cream composition.

27 Claims, No Drawings

DENTURE FIXATIVE

A high quality denture adhesive should exhibit several desirable characteristics and functionalities. One such attribute is that it should quickly generate tacky, uniform and viscous mucilages upon contact with saliva, so that the denture will be held in place as soon as it is seated in the mouth over the gums. It is also highly desirable that the mucilage possesses sufficient cohesive strength to withstand the stress of mastication and provides a cushion between the denture and its supporting gums or tissues during mastication. The denture fixative must also exhibit sufficient resistance to degradation under the extreme environmental temperature and pH changes which occur in the oral cavity during such common actions as drinking hot beverages such as coffee, cold beverages and highly acidic foods.

Many efforts are constantly being made to develop improved denture fixative compositions. Both natural and synthetic hydrophilic polymers have been employed either singly or in combination in liquid, powder, cream or film formulations. U.S. Pat. No. 3,003,988 describes a denture adhesive composition in which the denture fixative is a mixed partial salt containing calcium cation and alkali or quaternary ammonium cation of a lower alkyl vinyl ether-maleic anhydride type copolymer or its partial lower alkyl esters. Since then, many different denture compositions using this copolymer were disclosed as effective denture adhesives either in improved vehicles or in combination with other water soluble polymers or additives. See for example, U.S. Pat. Nos. 4,373,036 to Chang et al., 4,514,528 and 4,549,955 to Dhabhar et al., 4,910,247 to Haldar et al., 4,980,391 and 5,006,571 to Kumar et al., 5,037,924 to Tani et al. and 5,093,387 to Kumar et al., all of which are hereby incorporated by reference.

Many derivatives of a lower alkyl vinyl ether and maleic anhydride copolymer or maleic acid copolymer other than the sodium and the calcium partial salts mentioned above have been disclosed as effective denture adhesive compositions. U.S. Pat. No. 4,521,551 to Chang et al. discloses an effective denture adhesive composition containing a partial salt of an alkali cation of a lower alkyl vinyl ether and maleic acid copolymer which is also partly cross-linked with polyhydroxy compounds. U.S. Pat. No. 4,758,630 teaches an effective denture fixative composition comprised of the zinc or strontium partial salts of a lower alkyl vinyl ether and maleic acid copolymer wherein the zinc and strontium cations are "unmixed" with any other cations or ester functions in the copolymer salt. Also, U.S. Pat. No. 5,073,604 to Holeva et al. discloses zinc or strontium partial salts of a lower alkyl vinyl ether and maleic acid copolymer, wherein the zinc and strontium are "mixed" with calcium cations and optionally sodium cations in the copolymer salt. U.S. Pat. No. 5,304,616 to Rajaiah et al. further teaches mixed salts of sodium, iron, strontium and zinc cation of a lower alkyl vinyl ether and maleic acid copolymer as effective denture fixatives. And finally, another recent disclosure, U.S. Pat. No. 5,204,414 to Pelah et al., describes the use of a trivalent metal salt such as aluminium in combination with a calcium and/or sodium cation which when reacted with a lower alkyl vinyl ether and maleic acid copolymer forms an effective denture fixative composition.

It has now been discovered that a new series of cross-linked derivatives formed by reacting a combination of inorganic and organic cross-linkers with a lower alkyl vinyl ether and maleic anhydride or its acid copolymer can be employed as an effective denture fixative. The cross-linked copolymer unexpectedly shows more desirable adhesive characteristics than those copolymers cross-linked with divalent inorganic compounds. When in contact with water or saliva, this cross-linked copolymer forms a highly tacky, viscous and uniform mucilage which can be spread easily over the denture-mucosa interface to fill the gaps and provides not only a strong fixative property but also a cushion between the denture and its supporting gums and tissues. It is also highly stable and does not break down or lose its adhesive qualities when affected by adverse temperature or chemical conditions.

Accordingly, it is the objective of the present invention to provide new and improved denture adhesive compositions which comprise a new copolymer derivative consisting of lower alkyl vinyl ether and either a maleic anhydride or maleic acid copolymer that exhibits sufficient cohesive strength to withstand the stress of mastication, resists the degradative effects of environmental temperature and pH changes which occur in the oral cavity and provides a cushion between the denture and its supporting gums and tissues. This and other objectives of this invention will become apparent to those skilled in the art from the following detailed description.

SUMMARY OF THE INVENTION

This invention relates to denture adhesive compositions in powder, liquid, paste, film and gel formulations. More particularly, the denture fixative compositions contain a highly cross-linked copolymer of a lower alkyl vinyl ether-maleic anhydride/maleic acid copolymer such that up to about 85% of the total number of initial carboxyl groups in the copolymer are reacted and cross-linked. The copolymer of the lower alkyl vinyl ether and maleic anhydride or its acid used in the present invention has a specific viscosity not lower than 1.5 and the lower alkyl group has from about one to five carbon atoms.

The cross-linking agents employed in this invention are the mixtures of inorganic and organic compounds:

1. Inorganic cross-linking agents are selected from the group comprising:
   Divalent cations, preferably calcium, magnesium, strontium, and zinc either singly or in combination, in a sufficient amount to react from about 0.1% to about 80% of the total initial carboxyl groups in the copolymer, and 2. Organic cross-linking agents are selected from the group comprising:
   Bifunctional compounds, preferably polyhydroxyl compounds, most preferably propylene glycol and glycerin, either singly or in combination, in a sufficient amount to react from about 0.1% to about 20.0% of the total initial carboxyl groups in the copolymer.

This invention also is directed to denture adhesive compositions comprising the cross-linked copolymer and at least one hydrophilic polymer, in powder, liquid, cream, film and gel form. The preferable hydrophilic polymers are sodium carboxymethylcellulose, polyethylene oxide, sodium alginate and mixtures thereof.

DETAILED DESCRIPTION OF THE INVENTION

The polymeric adhesives of the present invention are the cross-linked derivatives of a lower alkyl vinyl ether and maleic anhydride or maleic acid copolymer (AVE/MA). The AVE/MA copolymer used in the present invention has a specific viscosity of not less than 1.5 and preferably is in the range of about 1.8 to about 4.0. Such copolymers have the repeating structural unit:

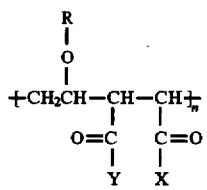

where X and Y each separately represent a hydroxyl moiety or together represent a single oxygen. R represents a lower alkyl moiety of 1 to about 5 carbon atoms, and n is large enough to provide the copolymers with a specific viscosity greater than 1.5. The copolymers are obtained by copolymerizing a lower alkyl vinyl ether monomer with maleic acid or maleic anhydride, and also can contain mixtures of the alkyl vinyl ethers. Suitable copolymers are also commercially available. For example, GANTREZ S series (acid form) and GANTREZ AN series (anhydride form) produced by ISP Investments Inc. of Delaware are particularly suitable for use in the present invention.

The copolymer derivatives employed in the present invention are cross-linked such that up to about 85 % of the total number of the original carboxyl groups in the copolymer are reacted. In determining the total number of initial carboxyl groups, the anhydride radical is considered as having two such groups. A 1.0% aqueous solution of the cross-linked copolymer of the present invention should have a pH of at least 4.3 and is preferably in the range of from about 4.5 to about 6.5.

The cross-linking agents employed in this invention are mixtures of inorganic and organic compounds. Suitable cross-linking agents are as follows:

1. Inorganic cross-linkers:
    Divalent cations, preferably calcium, magnesium, strontium and zinc, either singly or in combination, in a sufficient amount to react from about 0.1% to about 80.0%, and preferably from about 30.0% to about 75.0%, and most preferably from about 35.0% to about 70.0% of the total initial carboxyl groups in the copolymer, and
2. Organic cross-linkers:
    Biofunctional compounds, preferably, polyhydroxy compounds, such as propylene glycol, glycerin, ethylene glycol, tetramethylene glycol, sorbitol and the like and those which generally have from about 2 to about 6 carbon atoms. Most preferably, the polyhydroxy compounds are propylene glycol and glycerin in a sufficient amount to react with from about 0.1% to about 20.0%, preferably from 1.0% to about 18.0%, and most preferably from about 3.0% to about 15.0% of the total initial carboxyl groups in the copolymer.

The anionic portion of the inorganic cross-linking agents is not restricted, although it is preferably in the form of an oxide, hydroxide, carbonate or halide. The cross-linked copolymers also optionally comprise up to about 10.0% of the total initial carboxyl groups reacted with sodium cation. AVE/MA copolymer cross-linked with a mixture of divalent cations and polyhydroxyl compounds generates a much higher viscous mucilage than AVE/MA cross-linked with divalent cations alone. They show exceptional characteristics and functionality for denture adhesive compositions. When in contact with water or saliva, they quickly generate tacky, uniform and viscous mucilages which are extremely advantageous fixative properties for stabilization and maintenance of the denture in the oral cavity.

In order to cross-link the AVE/MA copolymer in the present invention, the cross-linking agents and copolymer, in a total amount of about 10.0% of solid, are dispersed in water at an ambient temperature. The dispersion is then mixed and/or heated to allow the completion of the reaction and to form a uniform, viscous solution. The reaction temperature may vary depending on the selection of the cross-linking agents and the form of the AVE/MA copolymer. In general, the cross-linking agents can react at room temperature with the copolymer in its acid form and at about 85° C. with the copolymer in its anhydride form. The solution can then be dried either at temperatures of about 300° C. for about 10 minutes or at temperatures of about 85° C. for about 10 to about 16 hours. The dried material, usually in a flake or sheet form, is milled and screened through a 100 mesh sieve.

Preferably, the cross-linked AVE/MA copolymer is combined with a hydrophilic polymer so as to enhance the denture adhesives ability to join swellable, tacky and viscous mucilages upon contact with saliva in the oral cavity. The preferred hydrophilic polymers of choice are selected from the group comprising carboxymethylcellulose, sodium carboxymethylcellulose sodium alginate, polyoxyethylene oxide, locust bean gum, xanthan gum, carageenan, methyl cellulose and mixtures thereof. The hydrophilic polymer is combined with the cross-linked AVE/MA copolymer in an amount of from about 10% to about 60% of the total weight of the adhesive composition. Preferably, the hydrophilic polymer is added in an amount of from about 12 wt % to about 50 wt %.

Each of the cross-linked AVE/MA copolymers of the present invention may be incorporated into the denture adhesive composition in an effective amount as the sole fixative component or in combination with other water soluble polymers and excipients as is known in the art such as fillers, lubricants, flavors, coloring agents, preservatives and the like. Mineral oil, petrolatum, fumed silica and mint flavor are examples of common excipients used in known commercial denture adhesive compositions. The amounts employed will be varied depending on the particular AVE/MA copolymer and cross-linking agent used, the degree of the cross-linking, the ratio of the inorganic cross-linker to the organic cross-linker, the amount of the hydrophilic polymer and the other constituents of the fixative compositions. In general, the cross-linked AVE/MA copolymer comprises from about 10.0% to about 80.0% weight percent of the fixative compositions, and preferably from about 15.0% to about 70.0% weight percent. The suitable hydrophilic polymers include both natural and synthetic gums, preferably sodium carboxymethylcellulose, polyethylene oxide and sodium alginate.

In order to further disclose and teach the present invention, various examples are set forth below. They are for illustrative purposes only, and it is understood that many minor changes or variations can be made with respect to the formulations and their amounts. To the extent that any such changes do not materially alter or change the make-up or functionality of the composition such changes are considered as falling within the spirit and scope of the invention as recited by the claims that follow.

EXAMPLE 1

A pre-mixed powder mixture of 75 parts of a commercially available AVE/MA copolymer (Gantrez AN 169), having a specific viscosity of 3.0, and 21 parts of zinc oxide ($ZnO_2$) was charged into a rapidly agitated solution containing 1000 parts of deionized water and 3.8 parts of propylene glycol (PG). The resulting slurry was then heated while being mixed, to 85° C., where it was maintained for an additional five (5) minutes. The resulting solution was then dried, milled and screened through a 100 mesh sieve. This Zn-PG•AVE/MA copolymer has a packed density of 0.8 g/ml and a pH of 4.9 as a 1.0% aqueous solution.

A cross-linked AVE/MA copolymer (Zn•AVE/MA) using the same reaction procedure but without propylene glycol in the deionized water was also prepared for comparison. The following Table 1 demonstrates the significant differences in their solution theologies:

TABLE 1

|  | Zn—PG.AVE/MA | Zn.AVE/MA |
| --- | --- | --- |
| % of carboxyl group reacted | | |
| Zn | 54.0 | 54.0 |
| PG | 9.5 | |
| Viscosity (mPa · s) of 14% aqueous solution | | |
| Shear rate @1.2 $s^{-1}$ | 150,000 | 12,500 |
| Shear rate @2.4 $s^{-1}$ | 156,000 | 15,600 |
| Shear rate @3.6 $s^{-1}$ | 137,000 | 14,600 |

EXAMPLE 2

Following a reaction procedure similar to that set forth in Example 1, magnesium-propylene glycol AVE/MA and calcium-propylene glycol AVE/MA cross-linked copolymers were prepared. The magnesium and calcium compounds used in the reactions were magnesium oxide and calcium hydroxide respectively. Those copolymers have a packed density in the range of 0.75 to 0.85 g/ml after the powders were milled to at least 100 mesh and a pH in the 5 range of from about 5.0 to 5.3, as a 1.0% aqueous solution. A cross-linked AVE/MA without propylene glycol as a cross-linking agent was also prepared for comparison. The following Table 2 illustrates the differences in their solution rheologies.

TABLE 2

|  | Mg.PG AVE/MA | Mg.AVE/MA | Ca—PG.AVE/MA | Ca.AVE/MA |
| --- | --- | --- | --- | --- |
| % of carboxyl group reacted | | | | |
| Mg | 54.9 | 54.9 | | |
| Ca | | | 54.9 | 54.9 |
| PG | 10.3 | | 10.3 | |
| Viscosity (mPa · s) of 10% aq. soln. | | | | |
| Shear rate @1.2 $s^{-1}$ | 198,000 | 8,300 | 31,250 | 6,250 |
| Shear rate @2.4 $s^{-1}$ | 167,000 | 9,400 | 53,100 | 5,200 |
| Shear rate @3.6 $s^{-1}$ | 135,000 | 9,000 | 50,100 | 5,500 |

As is clearly seen the propylene glycol composition of the present invention is far more viscous and less flowable than the control.

EXAMPLE 3

A strontium-glycerin AVE/MA cross-linked copolymer (Sr-Gly•AVE/MA) was prepared using a reaction procedure similar to that in Example 1. A premixed powder composition comprised of 65.3 parts of Gantrez AN169, having a specific viscosity of 3.0, and 32.8 parts of strontium carbonate ($SrCO_3$) was rapidly charged to an agitated solution containing 1000 parts of deionized water and 1.9 parts of glycerin (Gly). The resulting slurry was then heated, while being mixed to 85° C., where it was maintained for an additional five (5) minutes. The resulting solution was then dried in a glass tray at 85° C. for 16 hours. The dried material, usually in a flake or sheet form, was milled and screened through a 100 mesh sieve. The Sr-Gly AVE/MA cross-linked copolymer has a packed density of 0.8 g/ml and a pH of 5.2 as a 1.0% aqueous solution.

A cross-linked AVE/MA copolymer using the same reaction procedure but without glycerin in the deionized water was also prepared for comparison purposes. The following Table shows the differences in their solution rheologies.

TABLE 3

|  | Sr—Gly.AVE/MA | Sr.AVE/MA |
| --- | --- | --- |
| % of carboxyl group reacted | | |
| Sr | 55.0 | 54.9 |
| Gly | 7.6 | |
| Viscosity (mPa · s) of 10% aq. soln. | | |
| Shear rate @1.2 $s^{-1}$ | 29,200 | 2,100 |
| Shear rate @2.4 $s^{-1}$ | 26,000 | 4,200 |
| Shear rate @3.6 $s^{-1}$ | 27,800 | 3,500 |

As is evident from the data, the viscosity of the composition of the present invention containing glycerin was far greater than the control and hence comprises a thicker, more pliable adhesive.

EXAMPLE 4

A calcium-zinc propylene glycol AVE/MA cross-linked copolymer was prepared using a similar reaction procedure to that in Example 1. A premixed powder mixture of 73.1 pans of Gantrez AN169, having a specific viscosity of 3.0, 16.5 pans of calcium hydroxide ($Ca(OH)_2$) and 6.7 parts of zinc oxide ($ZnO_2$) was added to a rapidly agitated solution containing 1000 parts of deionized water and 3.7 pans of propylene glycol (PG). The resulting slurry was then heated, while being mixed, to 85° C., where it was maintained for an additional five (5) minutes. The resulting solution was then dried in a glass tray at 85° C. for about 16 hours. The dried material, usually in a flake or sheet form, was milled and screened through a 100 mesh sieve. This Ca-Zn-PG AVE/MA cross-linked copolymer has a packed density of 0.82 g/ml and a pH of 5.5, as a 1.0% aqueous solution.

A calcium-zinc-glycerin AVE/MA cross-linked copolymer was prepared using a similar reaction procedure. A premixed powder composition comprised of 74.5 parts of Gantrez AN169 having a specific viscosity of about 3.0, 16.8 parts of calcium hydroxide (Ca(OH)$_2$) and 6.7 parts of zinc oxide (ZnO$_2$) was charged to a rapidly agitated solution containing 1000 parts of deionized water and 1.8 parts of glycerin (Gly). The resulting slurry was then heated, while being mixed, to 85° C., where it was maintained for an additional five minutes. The resulting solution was then dried in a glass tray at 85° C. for about 16 hours. The dried material was then milled and screened through a 100 mesh sieve. This Ca-Zn-Gly cross-linked copolymer has a packed density of 0.80 g/ml and a pH of 5.4, as a 1.0% aqueous solution.

A cross-linked AVE/MA copolymer using the same reaction procedure but without propylene glycol or glycerin in the deionized water was also prepared for comparison purposes. The following Table 4 shows the differences in their solution rheologies.

TABLE 4

|  | Ca—Zn—PG AVE/MA | Ca—Zn AVE/MA | Ca—Zn—Gly AVE/MA |
|---|---|---|---|
| | % of carboxyl group reacted | | |
| Ca | 47.7 | 47.7 | 47.7 |
| Zn | 17.5 | 17.5 | 17.5 |
| PG | 10.3 | | |
| Gly | | | 6.2 |
| | Viscosity (mPa · s) of 10% aqueous solution | | |
| Shear rate @1.2 s$^{-1}$ | 200,000 | 56,000 | 343,700 |
| Shear rate @2.4 s$^{-1}$ | 424,000 | 187,000 | 468,700 |
| Shear rate @3.6 s$^{-1}$ | 387,000 | 212,000 | 479,000 |

Again, the cross-linked copolymers of the present invention were far more viscous than the control.

EXAMPLE 5

A strontium-zinc propylene glycol (Sr-Zn-PG) AVE/MA cross-linked copolymer was prepared using a similar reaction procedure to that in Example 1. A premixed powder composition consisting of 65.9 parts of Gantrez AN 169 having a specific viscosity of 3.0, 27.6 parts of strontium carbonate and 3.9 parts of zinc oxide was added to a rapidly agitated solution containing 1000 parts of deionized water and 3.7 parts of propylene glycol. The resulting slurry was then heated, while being mixed, to 85° C., where it was maintained for five (5) minutes. The resulting viscous solution was then dried in a glass tray at 85° C. for about 16 hours. The dried material, usually in a flake or sheet form was milled and screened through a 100 mesh sieve. This Sr-Zn-PG AVE/MA cross-linked copolymer has a packed density of 0.8 g/ml and a pH of 5.2, as a 1.0% aqueous solution.

A cross-linked copolymer using the same reaction procedure but without propylene glycol in the deionized water was also prepared for comparison purposes. The following Table 5 again demonstrates the increase of solution viscosity of the Sr-Zn-PG.AVE/MA cross-linked copolymer vs. Sr-Zn.AVE/MA cross-linked copolymer and its propensity to form a superior hold adhesive.

TABLE 5

|  | Sr—Zn—PG AVE/MA | Sr—Zn AVE/MA |
|---|---|---|
| | % of carboxyl group reacted | |
| Sr | 46.0 | 46.0 |
| Zn | 11.5 | 11.5 |
| PG | 8.2 | |
| | Viscosity (mPa · s) of 10.0% aqueous solution | |
| Shear rate @1.2 s$^{-1}$ | 50,000 | 25,000 |
| Shear rate @2.4 s$^{-1}$ | 53,100 | 22,900 |
| Shear rate @3.6 s$^{-1}$ | 47,900 | 20,800 |

EXAMPLE 6

Denture fixative creams were formulated by mixing the following ingredients at room temperature with a suitable mixer.

| Formulation | % W/W | | | | |
|---|---|---|---|---|---|
| Ingredients | A | B | C | D | E |
| Ca—Pg AVE/MA in Example 2 | 30.0 | 30.0 | | | |
| Ca—Zn—Gly AVE/MA in Example 4 | | | 25.0 | | |
| Ca—Zn—PG AVE/MA in Example 4 | | | | 25.0 | 25.0 |
| Sodium Carboxymethylcellulose | 25.0 | 20.0 | 5.0 | 20.0 | 5.0 |
| Polyethylene Oxide | | 5.0 | | | |
| Sodium Alginate | | | 20.0 | | 20.0 |
| Mineral Oil and Petrolatum | 43.0 | 43.0 | 48.0 | 53.0 | 48.0 |
| Fumed Silica | 1.0 | 1.0 | 1.0 | 1.0 | 1.0 |
| Flavor, Color and Preservative | 1.0 | 1.0 | 1.0 | 1.0 | 1.0 |

All five formulations were highly tacky and viscous and formed a pliable exudate which strongly adhered to the denture plate.

EXAMPLE 7

Denture fixative powders were formulated by mixing the following ingredients at room temperature in a suitable mixer.

| Ingredient | % W/W | |
|---|---|---|
| Zn—PG AVE/MA in Example 1 | 25.0 | |
| Mg—PG AVE/MA in Example 2 | | 25.0 |
| Sodium Carboxymethylcellulose | 40.0 | 40.0 |
| Dicalcium Phosphate Anhydride | 34.0 | 34.0 |
| Flavor, Color and Preservative | 1.0 | 1.0 |

The powders were dispersed about the inside plate of standard human dentures and slightly moistened with water. The powders immediately formed a spreadable, tacky mucilage which when pressed against a ridged surface simulating a gum line became securely fastened and resisted removal therefrom.

What we claim is:

1. An improved denture adhesive consisting essentially of a highly cross-linked lower alkyl vinyl ether/maleic anhydride copolymer wherein 85% of the total number of initial carboxyl groups in the copolymer are cross-linked by a cross-linking agent selected from the group consisting of a mixture of inorganic and organic compounds.

2. The denture adhesive composition of claim 1 wherein said inorganic cross-linking agents are selected from the group consisting of divalent cations in an amount sufficient to react with about 0.1% to about 80% of the total number of initial carboxyl groups in the copolymer.

3. The denture adhesive composition of claim 2 wherein said organic cross-linking agents are selected from the group consisting of bifunctional compounds in an amount sufficient to react with about 0.1% to about 20% of the total initial carboxyl groups present in the copolymer.

4. The denture adhesive composition of claim 3 wherein said inorganic cross-linking agents are selected from the group consisting of polyhydroxyl compounds.

5. The denture adhesive composition of claim 4 wherein said bifunctional compound is selected from the group consisting of polyhydroxyl compounds.

6. The denture adhesive of claim 5 wherein said polyhydroxyl compounds are selected from the group consisting of propylene glycol, glycerin and mixtures thereof.

7. The denture adhesive of claim 6 further comprising a hydrophilic polymer.

8. The denture adhesive of claim 7 wherein said hydrophilic polymer is present in an amount of from about 10 wt % to about 60 wt %.

9. The denture adhesive composition of claim 8 wherein said hydrophilic polymer is selected from the group consisting of modified cellulosics.

10. The denture adhesive composition of claim 9 wherein said hydrophilic polymer is selected from the group consisting of sodium carboxymethyl cellulose, carboxymethyl cellulose, methyl cellulose, carrageenan, locust bean gum, xanthan gum, sodium alginate, polyoxyethylene oxide and mixtures thereof.

11. The denture adhesive composition of claim 10 further comprising fillers, coloring agents, lubricants, preservatives, flavors and sweeteners.

12. The denture adhesive composition of claim 1 or 11 wherein said adhesive is formulated as a liquid, powder, cream, paste or gel.

13. The improved denture adhesive of claim 12 wherein said lower alkyl vinyl ether/maleic anhydride copolymer has a specific viscosity of not less than 1.5.

14. The improved denture adhesive composition of claim 13 wherein the lower alkyl moiety of said lower alkyl vinyl ether is comprised of from about one to about five carbon atoms.

15. An improved denture adhesive composition consisting of a highly cross-linked lower alkyl vinyl ether/maleic acid copolymer wherein 85% of the total number of initial carboxyl groups in the copolymer are cross-linked by a cross-linking agent selected from the group consisting of a mixture of inorganic and organic compounds.

16. The denture adhesive composition of claim 15 wherein said inorganic cross-linking agents are selected from the group consisting of divalent cations in an amount sufficient to react with about 0.1% to about 80% of the total number of initial carboxyl groups in the copolymer.

17. The denture adhesive composition of claim 16 wherein said organic cross-linking agents are selected from the group consisting of bifunctional compounds in an amount sufficient to react with about 0.1% to about 20% of the total initial carboxyl groups present in the copolymer.

18. The denture adhesive composition of claim 17 wherein said inorganic cross-linking agents are selected from the group consisting of calcium, magnesium, strontium, zinc and mixtures thereof.

19. The denture adhesive composition of claim 18 wherein said bifunctional compounds are selected from the group consisting of polyhydroxyl compounds.

20. The denture adhesive of claim 19 wherein said polyhydroxyl compounds are selected from the group consisting of propylene glycol, glycerin and mixtures thereof.

21. The denture adhesive of claim 20 further comprising a hydrophilic polymer.

22. The denture adhesive of claim 21 wherein said hydrophilic polymer is present in an amount of from about 10 wt % to about 60 wt %.

23. The denture adhesive composition of claim 22 wherein said hydrophilic polymer is selected from the group consisting of sodium carboxymethyl cellulose, methyl cellulose, carboxymethyl cellulose, polyoxyethylene oxide, sodium alginate, xanthan gum, locust bean gum carrageenan and mixtures thereof.

24. The denture adhesive composition of claim 23 further comprising fillers, coloring agents, lubricants, preservatives, flavors and sweeteners.

25. The denture adhesive composition of claim 15 or 24 wherein said adhesive is formulated as a liquid, powder, cream, paste or gel.

26. The improved denture adhesive of claim 25 wherein said lower alkyl vinyl ether/maleic acid copolymer has a specific viscosity of not less than 1.5.

27. The improved denture adhesive composition of claim 26 wherein the lower alkyl moiety of said lower alkyl vinyl ether is from about one to five carbon atoms.

* * * * *